(12) United States Patent
Seymour et al.

(10) Patent No.: US 9,036,380 B2
(45) Date of Patent: May 19, 2015

(54) MULTI-LEVEL INVERTER CONTROL METHOD AND CONTROLLER FOR A WIND GENERATION POWER SYSTEM

(75) Inventors: Robert A. Seymour, Roanoke, VA (US); Allen Ritter, Roanoke, VA (US)

(73) Assignee: General Electric Company, Schenectady, NY (US)

( * ) Notice: Subject to any disclaimer, the term of this patent is extended or adjusted under 35 U.S.C. 154(b) by 686 days.

(21) Appl. No.: 13/345,343

(22) Filed: Jan. 6, 2012

(65) Prior Publication Data
US 2013/0176762 A1    Jul. 11, 2013

(51) Int. Cl.
*H02M 5/458* (2006.01)
*H02M 7/487* (2007.01)
*H02M 7/5387* (2007.01)

(52) U.S. Cl.
CPC .......... *H02M 7/53871* (2013.01); *H02M 7/487* (2013.01)

(58) Field of Classification Search
CPC .................................................... Y02E 10/763
USPC ............................ 363/34, 37, 41, 132; 290/44
See application file for complete search history.

(56) References Cited

U.S. PATENT DOCUMENTS

| 5,255,174 | A   |   | 10/1993 | Uchino |       |
|-----------|-----|---|---------|--------|-------|
| 2010/0308584 | A1 | * | 12/2010 | Coates et al. | 363/34 |
| 2010/0315091 | A1 |   | 12/2010 | Hartlieb | |
| 2012/0206841 | A1 |   | 8/2012 | Harbourt | |
| 2013/0076134 | A1 | * | 3/2013 | Smith et al. | 363/97 |

FOREIGN PATENT DOCUMENTS

EP    0613234 A1    8/1994

OTHER PUBLICATIONS

Search Report and Written Opinion from corresponding EP Application No. 12199163.2, dated Apr. 3, 2013.

* cited by examiner

*Primary Examiner* — Matthew Nguyen
*Assistant Examiner* — Jye-June Lee
(74) *Attorney, Agent, or Firm* — Sutherland Asbill & Brennan LLP (57) ABSTRACT

A system, method, and apparatus for providing three level inverter modulation is disclosed. In one embodiment, control signals can be provided to control a three level inverter in a power converter based on at least one feedback signal.

17 Claims, 5 Drawing Sheets

MULTI-LEVEL INVERTER CONTROL METHOD AND CONTROLLER FOR A WIND GENERATION POWER SYSTEM

FIELD OF THE INVENTION

This invention generally relates to power converters, and in particular to providing three level inverter modulation.

BACKGROUND OF THE INVENTION

Power converters are used to provide power from distributed generation sources for use on local loads or for delivery to a power grid. Such power converters are instrumental in applications such as for providing AC power from power sources like wind generators. With an increased societal focus on anthropogenic environmental degradation, particularly in relation to green house gas (GHG) and certain other emissions, there has been an increased trend towards distributed renewable power generation. For example, in recent years, there has been a steep increase in the number of wind generation farms that provide power to the power grid. Such distributed power generation sources may require power converters that are efficient, inexpensive, reliable, and have a minimal form factor.

A power converter for a renewable power source may include an inverter that is modulated by an inverter controller providing modulation signals. The inverter can have various topologies including two level or three level inverter. In a two level inverter, the modulation signal provided to each of the bridges of the inverter can have two voltage levels and the output power of each of the bridges of the inverter can have two levels, such as two voltage levels. Likewise, in a three level inverter, the modulation signal provided to each of the phases of the inverter can have three voltage levels and the output power of each of the bridges of the inverter can have three levels, such as three voltage levels. In general, three inverters with resulting three levels of modulation may be more efficient, resulting in reduced thermal losses in the inverter, than two level inverters with two levels of modulation. In other words, three level inverter modulation may result in reduced switching losses at low distortion per commutation period compared to a two level inverter modulation for similar modulation frequencies and power output.

The control signals, or modulation signals provided to the inverter phase legs are typically determined by an inverter controller using feedback from the inputs and the outputs of the inverter. The task of achieving a relatively high level of precision of inverter control for three level modulation can be difficult because the feedback signals provided to the inverter may not be consistent from one period of the inverter control signal to the next period of the inverter control signal.

BRIEF SUMMARY OF THE INVENTION

Certain embodiments of the invention can provide systems, methods, and apparatus for providing three level inverter modulation. Certain embodiments of the invention can provide control signals to a three level inverter while minimizing the control effort required by an inverter controller. Additionally, other embodiments of the invention can provide control signals that have a relatively low frequency of modulation. Certain other embodiments of the invention can further compensate for errors in generating inverter control signals for three level inverters. In one aspect, the compensation may be performed by the inverter controller. In another aspect, the compensation may be performed based upon a measured signal provided in a feedback loop. In yet another aspect, the compensation may be performed based upon mathematical manipulation of the measured signal and comparison of the mathematical manipulation of the measured signal to a reference signal. Further, errors in generating inverter control signals may be detected by performing one or more definite integrals of the measured signal. The measured signal in one aspect may be a current measurement feedback signal.

In one embodiment, a wind generation power system can include at least one power source, an inverter for receiving a power input from the at least one power source and outputting a power output, and an inverter controller for controlling the inverter. The inverter controller can further include an input for receiving at least one measurement signal and a reference signal and an output for providing at least one control signal to the inverter, wherein, a definite integral of the at least one measurement signal is calculated and the at least one control signal is determined based on the definite integral and the at least one current signal is modified based partly upon an error level determined from the definite integral and the reference current signal.

In another embodiment, a method can include receiving at least one measurement signal, generating a control signal partly based on the measurement signal, determining an error level based at least partly on the measurement signal, modifying the control signal if the error level is greater than a predetermined threshold, and providing the control signal.

In yet another embodiment, an inverter controller for use with a renewable power source can include an input for receiving at least one measurement signal and a reference current signal, an output for providing at least one control signal. A definite integral of the at least one measurement signal is calculated and the at least one control signal is determined based on the definite integral and the at least one current signal is modified based partly upon an error level determined from the definite integral and the reference signal.

Other embodiments, features, and aspects of the invention are described in detail herein and are considered a part of the claimed inventions. Other embodiments, features, and aspects can be understood with reference to the following detailed description, accompanying drawings, and claims.

BRIEF DESCRIPTION OF THE FIGURES

Reference will now be made to the accompanying tables and drawings, which are not necessarily drawn to scale, and wherein.

DETAILED DESCRIPTION OF EMBODIMENTS OF THE INVENTION

Embodiments of the invention are described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Embodiments of the invention may provide apparatus, systems, and methods for removing thermal energy from a collection of circuit boards. Embodiments of the invention may further enable improved cooling via both convection cooling and conductive cooling. The improvements may provide reduced temperatures within enclosures containing circuit boards and electronic components.

Example embodiments of the invention will now be described with reference to the accompanying figures.

Figure 1:
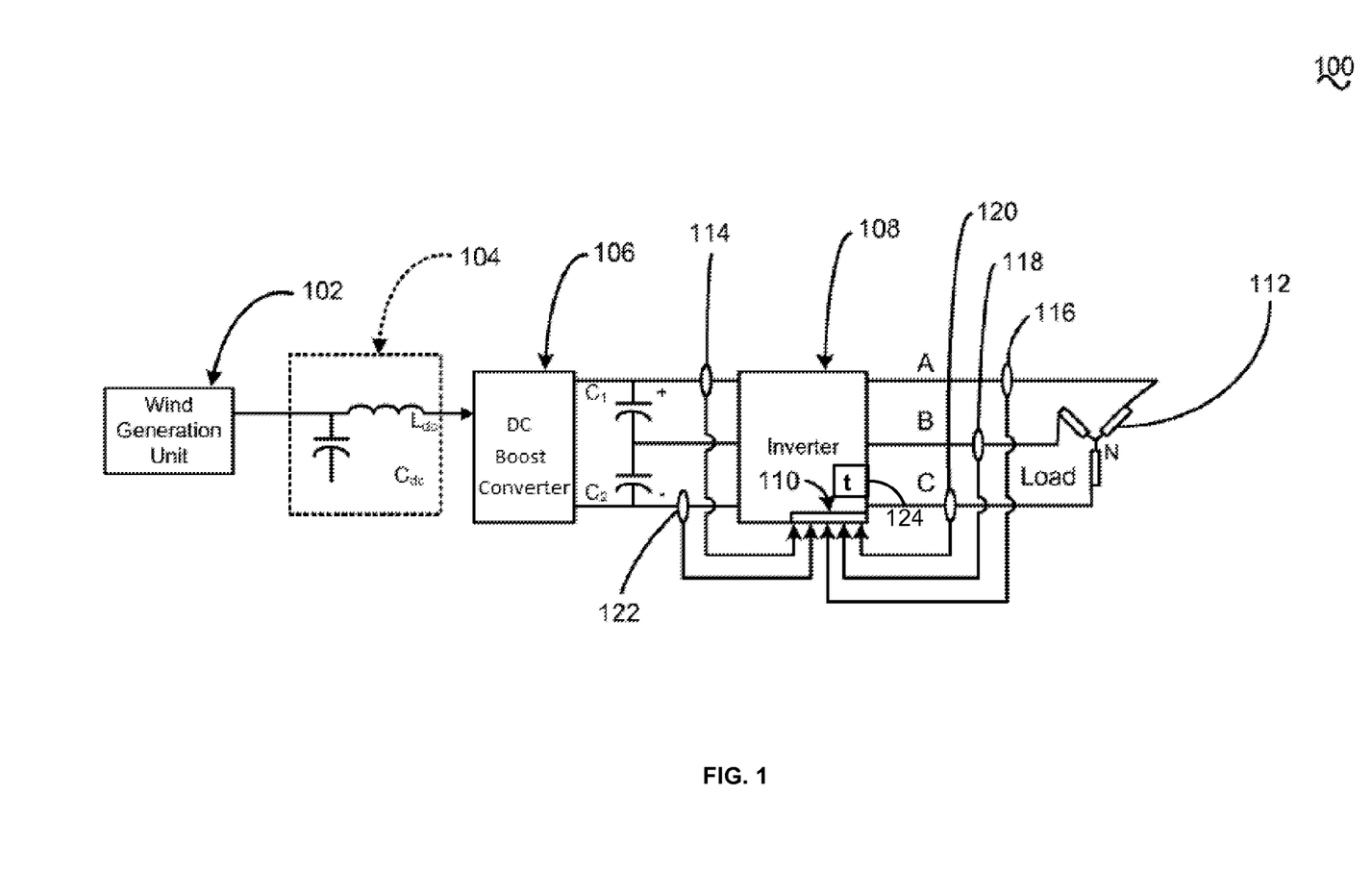
FIG. 1 is a simplified schematic diagram of an example power system that can be operated according to an embodiment of the invention.

Referring now to FIG. 1, a power system 100 that can be operated according to an embodiment of the invention is described. The power system 100 can include a power supply such as a wind generation unit 102, a DC input filter 104 electrically connected to and receiving power from the power supply, such as 102, which can be further electrically connected to an AC to DC converter, depicted as a DC boost converter 106. The DC boost converter 106 can be connected to an inverter 108 that can output AC power to a load 112 with capacitors $C_1$ and $C_2$ shunted from the power to ground between the DC boost converter 106 and the inverter 108.

The output of the inverter 108 may have multiple phases, such as three phases, A, B, and C, as shown in FIG. 1. Each of the phases A, B, and C may be separated from each other by about 120° and may be provided to the load 112. The load in this example embodiment is shown as a Y-configuration for illustrative purposes, but may be any known configuration, including a delta configuration.

The inverter 108 may further include an inverter controller 110 or inverter regulator for generating control signals for the operation of the inverter 108 and for controlling the output of the inverter 108. The inverter controller 110 can receive measurement signals from one or more voltage or current sensors 114, 116, 118, 120, and 122 and provide inverter control signals based on the measurement signals from sensors 114, 116, 118, 120, and 122. The sensors 114 and 122 may provide a DC voltage, DC feedback voltage ($V_{dcFbk}$) measured at the input to the inverter 108. Each of the sensors 116, 118, and 120 may further provide an AC current, AC line feedback current ($L\_I_{Fbk}$) measured at the output of the inverter 108, an AC voltage, voltage feedback ($V_{Fbk}$), and a second AC current, feedback current ($I_{Fbk}$) for each of the three phases A, B, and C. In other words, sensor 116 may measure signals $L\_I_{Fbk\_A}$, $V_{Fbk\_A}$, $I_{Fbk\_A}$, corresponding to phase A and provide the same to the inverter controller 110 for the purpose of generating inverter 108 control signals based at least partly thereon. Similarly, sensor 118 may measure signals $L\_I_{Fbk\_B}$, $V_{Fbk\_B}$, $I_{Fbk\_B}$, corresponding to phase B and provide the same to the inverter controller 110. Finally, sensor 120 may measure signals $L\_I_{Fbk\_C}$, $V_{Fbk\_C}$, $I_{Fbk\_C}$, corresponding to phase C and provide the same to the inverter controller 110. In certain embodiments, one or more of the aforementioned measurements may be estimated based on the other of the one or more measurements.

Although, the power supply is illustrated as a wind generation unit 102, it can, in other embodiments, be any DC power source including, but not limited to, a photovoltaic cell, a fuel cell, an electrolytic cell, or combinations thereof. As a further embodiment, the power source can be a rectified non-DC power sources such as from wind water harvesting, or solar-thermal (solar concentrator) sources. Additional power sources can include a rectified turbine-generator output where the turbine is driven using any variety of known methods including, but not limited to, burning of fossil fuels and other hydrocarbons, nuclear, hydroelectric, or combinations thereof.

The DC input filter 104 can include an inductor $L_{dc}$ and a capacitor $C_{dc}$. One purpose of the DC input filter 104 can be to prevent current with the chopping frequency of the DC boost converter 106 to flow to the power supply 102 and thereby disrupt the operation of the power supply 102. The inductor $L_{dc}$ and the capacitor $C_{dc}$ may be appropriately sized to filter out the chopping frequency of the DC boost converter 106. The DC input filter 104 may also be implemented by any known alternative configuration other than the LC configuration shown.

One purpose of the DC boost converter 106 may be to step up DC voltage. In other words, the DC boost converter 106 may accept power at a certain DC input voltage and output the power at a voltage greater than the DC input voltage. The output voltage of the DC boost converter 106 may be selected at a particular level for input to the inverter 108 to further provide a particular output from the inverter 108.

One purpose of the capacitors $C_1$ and $C_2$ may be to filter out any high frequency components at the output of the DC boost converter 106, prior to the signal being provided to the inverter 108. DC power with a boosted voltage is provided to the inverter 108 and the inverter 108 converts the DC power to AC power at its output.

Figure 2:
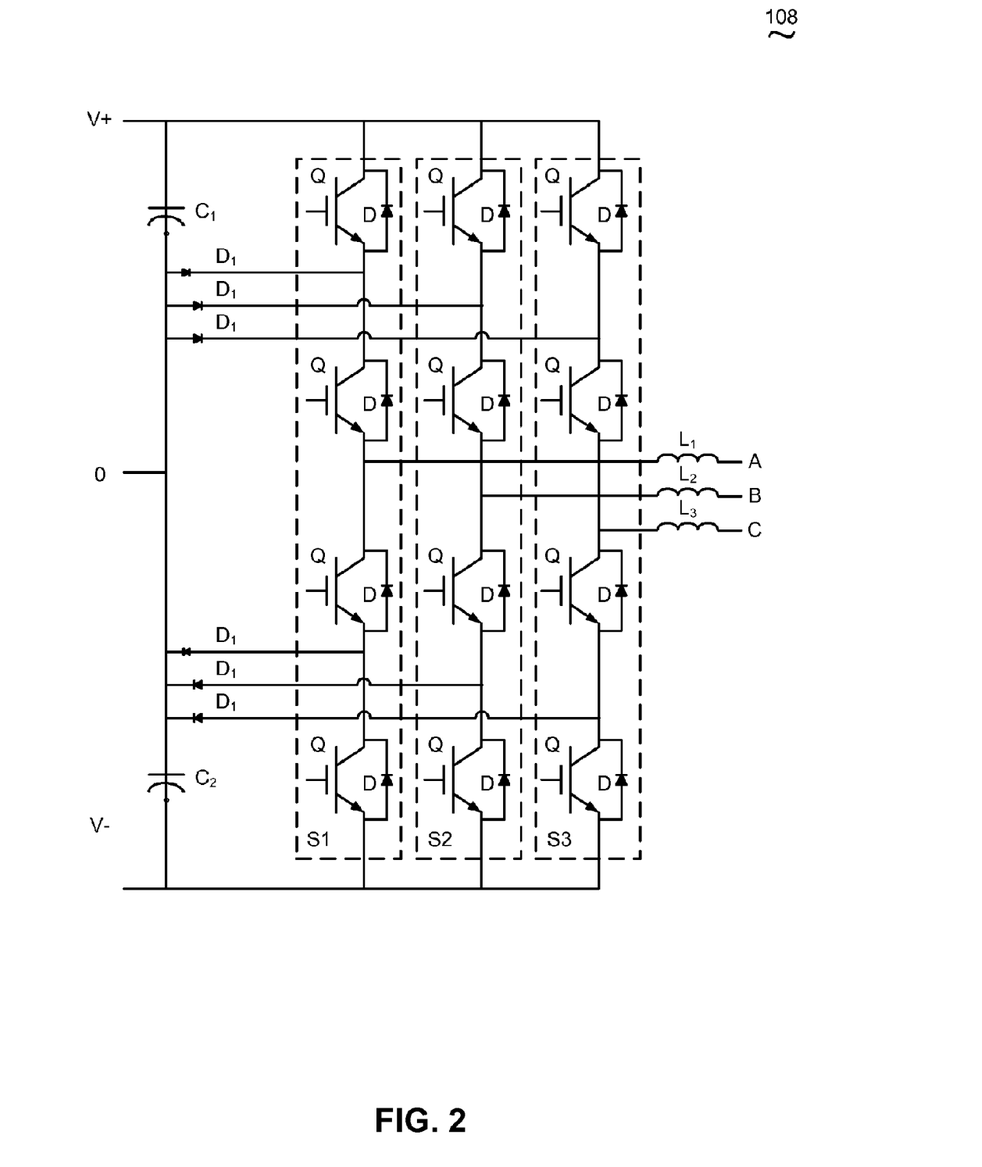
FIG. 2 is a simplified schematic diagram of an example three level inverter as part of the power system of FIG. 1 that can be operated according to an embodiment of the invention.

Referring now to FIG. 2, an example three level inverter 108 that can be operated in accordance with embodiments of the invention can be provided with a positive voltage (V+), a negative voltage (V−), and a DC mid-voltage connection (0). The input voltages V+ and V− of the inverter 108 can be provided to three bridges S1, S2, and S3, corresponding to the three phases A, B, and C of output power, via the capacitors $C_1$ and $C_2$ and diodes $D_1$ to control current flow through the phase legs S1, S2, and S3. There may be an inductor L1, L2, and L3 provided at the output of each of the phase legs S1, S2, and S3, respectively, for the purposes of smoothing and removing noise from the output of the inverter 108. Each of the phase legs S1, S2, and S3 may have multiple transistors Q, such as insulated gate bipolar transistors (IGBT) and diodes D. During operation, control signals, as generated by the inverter controller 110 may be provided to the gates of the transistors Q to selectively enable various current paths through each bridge S1, S2, and S3 of the inverter 108.

In one aspect, the control signals provided to the inverter 108 may turn on and turn off various transistors in a particular sequence within each phase leg S1, S2, and S3 of the inverter 108 such that the output at each of the phases A, B, and C of the inverter 108 may transition from about V+ to 0 to V− to 0, and repeatedly follow the same sequence. In another aspect, each of the phases A, B, and C may transition in the same sequence of about V+ to 0 to V− to 0, but may be phase shifted in time relative to each other by about 120°. In yet another aspect, the output frequency of each of the three phases A, B, and C may be substantially the same.

To operate the three phase and three level inverter 108 to provide a desired magnitude, frequency, and relative phase for each of the three output phases A, B, and C, appropriate control signals may be provided to the inverter 108 by the inverter controller 110. In general, three level inverters 108 can provide at least one of reduced switching losses or reduced distortion from switching of transistors Q than two level inverters operating under similar conditions. However, the control signals provided to a three level inverter 108 can be more complex than the control signals provided to a two level inverter. Therefore, the generation of control signals for a three level inverter 108 may take more control effort than for a two level inverter.

The inverter controller 110 may receive one or more measurement signals, for example for each output phase of the inverter 108 and apply mathematical algorithms to the same to generate the inverter control signals. In one aspect, the inverter controller 110 may integrate one of the measurement signals measured by sensors 116, 118, and 120 over one period of the signal and generated inverter control signals based on the value of the measurement signal over one period "t" 124 of FIG. 1.

Figure 3:
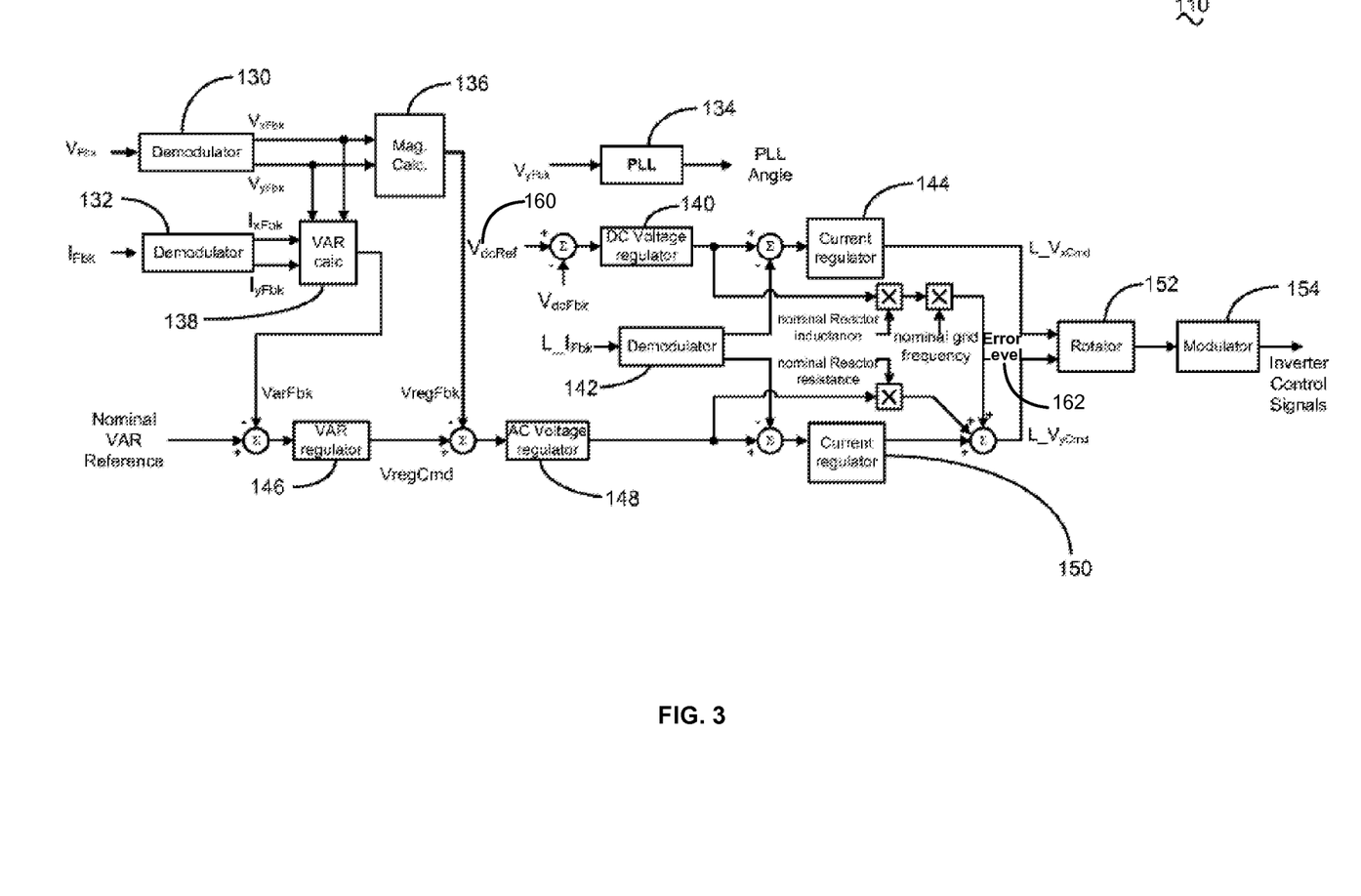
FIG. 3 is a simplified schematic diagram of an example inverter controller for controlling the inverter of FIG. 2 according to an embodiment of the invention.

Referring now to FIG. 3, an example inverter controller 110 according to an embodiment of the invention is described. In one aspect, the inverter controller 110 can receive the voltage and current measurements from sensors 114, 116, 118, 120, and 122 as described above in a time series and manipulate the measurements to generate inverter control signals. The inverter control signals may be signals to modulate solid state switches, such as the IGBTs Q within the inverter 108. Such signals may further be pulse width modulation (PWM) signals for gating phase legs S1, S2, and S3 within the inverter 108. The generated signals may further cause the inverter 108 to provide a three level output based on the control signals provided by the inverter controller 110 as described herein. For the purposes of clarity and brevity, the functioning of the inverter controller 110 will be described by considering measurement signals from one phase of the multiple phases A, B, C of the inverter output 108. In other words, the feedback signals provided to the inverter controller 110 are referred to generically as $L\_I_{Fbk}$, $V_{Fbk}$, $I_{Fbk}$ to illustrate the operation of the inverter controller 110. It should be noted that for multiphase inverters 108, feedback signals corresponding to each phase A, B, and C can be provided to the inverter controller 110 and inverter control signals may be generated for each of the phases A, B, and C of the power system 100.

$V_{Fbk}$ and $I_{Fbk}$ can be provided to demodulator blocks 130 and 132, respectively, to provide decomposed signals of both measurements $V_{Fbk}$ and $I_{Fbk}$ in a rotating reference frame. The demodulators 130 and 132 may, in one aspect, accept angular information from a phase lock loop (PLL) 134 to generate a quadrature signal to produce an orthogonal decomposition of the input signals $V_{Fbk}$ and $I_{Fbk}$. The $V_{Fbk}$ measurement may be decomposed into two orthogonal signals $V_{xFbk}$ and $V_{yFbk}$ and the $I_{Fbk}$ measurement may be decomposed into two orthogonal signals $I_{xFbk}$ and $I_{yFbk}$.

Signals $V_{xFbk}$ and $V_{yFbk}$ can be provided to a magnitude calculation block 136 to determine the magnitude of $V_{Fbk}$ as $V_{regFbk}$. Additionally, $V_{xFbk}$, $V_{yFbk}$, $I_{xFbk}$, and $I_{yFbk}$ can be provided to a VAR calculation block 138 to determine the cross product of current and voltage as a signal $VAR_{Fbk}$. Signal $V_{yFbk}$ is also provided to the PLL 134 to generate angular information that is used by the demodulators 130 and 132, as well as demodulator 142 and rotator 152.

Measurement VdcFbk may be subtracted from a DC reference voltage VdcRef 160 that is provided to the inverter controller 110 and the difference can be provided to a DC voltage regulator 140. The measurement L_IFbk is provided to the demodulator 142. Demodulator 142 operates similarly to the demodulators 130 and 132, where the input measurement L_IFbk can be decomposed into two orthogonal signals L_IxFbk and L_IyFbk. The L_IxFbk signal is subtracted from the output of the DC voltage regulator 140 and the difference can be provided to a current regulator 144 that generates a command signal L_VxCmd. The current regulator 144 can be any one of known regulator types including, but not limited to proportional (P), proportional integral (PI), proportional integral derivative (PID), or combinations thereof. In one aspect, L_VxCmd may be the net current regulator 144 output or the sum of all the component outputs.

Continuing on with FIG. 3, a nominal voltage current reactive (VAR) reference signal may be provided. The nominal VAR reference signal may be provided, for example, from a utility company to control the amount of reactive power provided by the power system 100. The nominal VAR reference may be summed with a signal from a feedback loop to generate a command signal $VAR_{Cmd}$. The $VAR_{Fbk}$ signal may be subtracted from the $VAR_{Cmd}$ signal and provided to a VAR regulator 146 to provide another command signal $V_{regCmd}$. The VAR regulator 146 can regulate how much reactive power is provided by the power system 100. The $V_{regFbk}$ signal may be subtracted from the $V_{regCmd}$ signal and provided to an AC voltage regulator 148. The signal $L\_I_{yFbk}$ can be subtracted from the output of the AC voltage regulator and provided to a current regulator 150. Like current regulator 144, the current regulator 150 may be of any known type and may generate several component signals, such as an integral signal or a derivative signal. One or more of the component signals of the current regulator 150 may be summed with the product of the output of the DC voltage regulator 140, nominal reactor inductance, and nominal grid frequency and the product of the output of the AC voltage regulator 148 and the nominal reactor resistance to produce a command signal $L\_V_{yCmd}$. The use of regulator outputs, as discussed here, with product signals may be referred to as regulator feed forwards.

The command signals $L\_V_{yCmd}$ and $L\_V_{xCmd}$ in the rotating reference frame may be provided to the rotator 152 to generate a signal combining both $L\_V_{yCmd}$ and $L\_V_{xCmd}$ to generate a command signal $U_{Cmd}$ in the non-rotating reference frame. The command signal $U_{Cmd}$ can then be provided to a modulator 154 to generate inverter control signals. The inverter control signals at the output of the modulator 154 can be, for example, a pulse width modulation (PWM) signal for gating a bridge of the inverter 108.

In one aspect, the command signal $U_{Cmd}$ is dependent on the output of the current regulators 144 and 150. Current regulators 144 and 150 may generate a integral output that is a component in determining the inverter control signal $U_{Cmd}$. The integral output of the current regulators 144 and 150 may be a definite integral integrated over a period of the input measurement signals from sensors 114, 116, 118, 120, and 122. The definite integral can be a definite integral of a current as depicted in FIG. 3. The current can be measured as a the current through an inductor with a time varying voltage across the same. The definite integral can further be used to generate the inverter control signal.

If the definite integral outputted from the current regulators 144 and 150 varies from one period to the next, the inverter controller 110 may try to inherently compensate for the variation from one period to the next. However, the variation may be an artifact of the modulation of the time period of integration for generating the definite integral with the feedback signal $L\_I_{Fbk}$ in one or both of the current regulators 144 and 150. In some aspects, in two level inverters, the inverter controller may be more robust to such imprecise integration of voltage over the time period. In three level inverters 108, however, the inverter controller 110, and the modulator 154 in particular, may try to compensate for variations in the definite integral output from the regulators 144 and 150 by increasing the inverter control signal complexity that is outputted from the modulator 154. Increasing signal complexity, with greater high frequency components associated therewith, of the inverter may generally increase the distortion in the IGBTs Q of the three level inverter 108. Alternatively, the modulator 154 may overcompensate for such variations in the definite integral by repeatedly modifying the inverter control signal $U_{Cmd}$, which may result in a distorted overall power output of the inverter 108.

In effect, the definite integral generated in the current regulators 144 and 150 may be compared to a reference signal, such as a reference current signal. An error level 162 may be calculated as a difference between the definite integral and the reference signal. For example, if a definite integral of a current measurement signal is determined and an error level 162 can be determined as the difference between the definite integral and a current reference signal. The error level can then be compared to a predetermined threshold to determine if the inverter control signal should be modified. In one aspect, the modification of the inverter control signal may be made if the calculated error signal exceeds a predetermined threshold. The predetermined threshold may be configured within the modulator 154 of the inverter controller 110. In one aspect, the predetermined threshold may be an average of the definite integral over several periods of the measured signal. The predetermined threshold may, in some cases, be zero. The modification of the one or more control signals based on the error level may be at the modulator 154. In other words, definite integrals of one or more measurement signals over a period of the signals, such as any variety of current or voltage feedback signals may be determined at the inverter controller 110. The one or more definite integrals may vary from one period to the next for various reasons, including due to the time of the integration of the measurement signal not corresponding exactly with the start and end of a signal period. A three level inverter can be more sensitive to such slight phase or frequency mismatch of the integral periods relative to the corresponding feedback measurement signals. According to certain embodiments of the invention, an error level can be determined partly corresponding to the phase or frequency mismatch described above. In other words, the error level may be predictable and, therefore, may be used to reduce the distortion in the signal. The control signals generated by the inverter controller 110 can be modified based at least partly on the error level and predictions of the same. The modifications to the control signals can include changing the amplitude, relative phase, or the frequency of the control signals.

Although the inverter controller 110 is described with current regulators 144 and 150 generating various mathematical manipulations of a current signal, such as a definite integral of a current measurement signal, alternatively, the current regulators 144 and 150 can be substituted with voltage regulators with feedback voltage provided to the same.

It should be noted again, that in a multiphase power system 100, the inverter controller 110 may receive measurements for each of the phases of the power system 100 and provide control signals for each of the phases of the power system 100. For example, in a three phase power system, the inverter controller 110 may receive a DC voltage $V_{dcFbk}$, as well as, a first AC current $L\_I_{Fbk\_A}$, $L\_I_{Fbk\_B}$, and $L\_I_{Fbk\_C}$, an AC voltage $V_{Fbk\_A}$, $V_{Fbk\_B}$, and $V_{Fbk\_C}$, and a second AC current $I_{Fbk\_A}$, $I_{Fbk\_B}$, and, $I_{Fbk\_C}$ measurements corresponding to each of the phases A, B, and C of the power system. The inverter controller 110 may further generate intermediary signals corresponding to each of the phases and provide control signals for each phases $U_{Cmd\_A}$, $U_{Cmd\_B}$, and $U_{Cmd\_c}$ of the power system.

In other embodiments, the inverter controller 110 as depicted in FIG. 3 may be provided for each phase of the inverter 108. In other words, if the inverter 108 provides three phase power with each phase having a relative phase of 120°, there may be three separate inverter controllers 110 as depicted in FIG. 3, each one controlling each phase A, B, and C of the inverter 108 output.

In further embodiments, the inverter controller 110 as depicted in FIG. 3 may only use a single AC current measurement, along with the DC voltage measurement, and AC voltage measurement to generate inverter control signals. In such a case, the second AC current signal may be estimated rather than measured.

It should also be noted, that the circuit topology of the inverter controller 110 may be modified in various ways in accordance with certain embodiments of the invention. For example, in certain embodiments, one or more circuit components may be eliminated or substituted with equivalent or nearly equivalent circuit elements. Additionally, in other embodiments, other circuit elements may be added to or present in the inverter controller 110.

Figure 4:
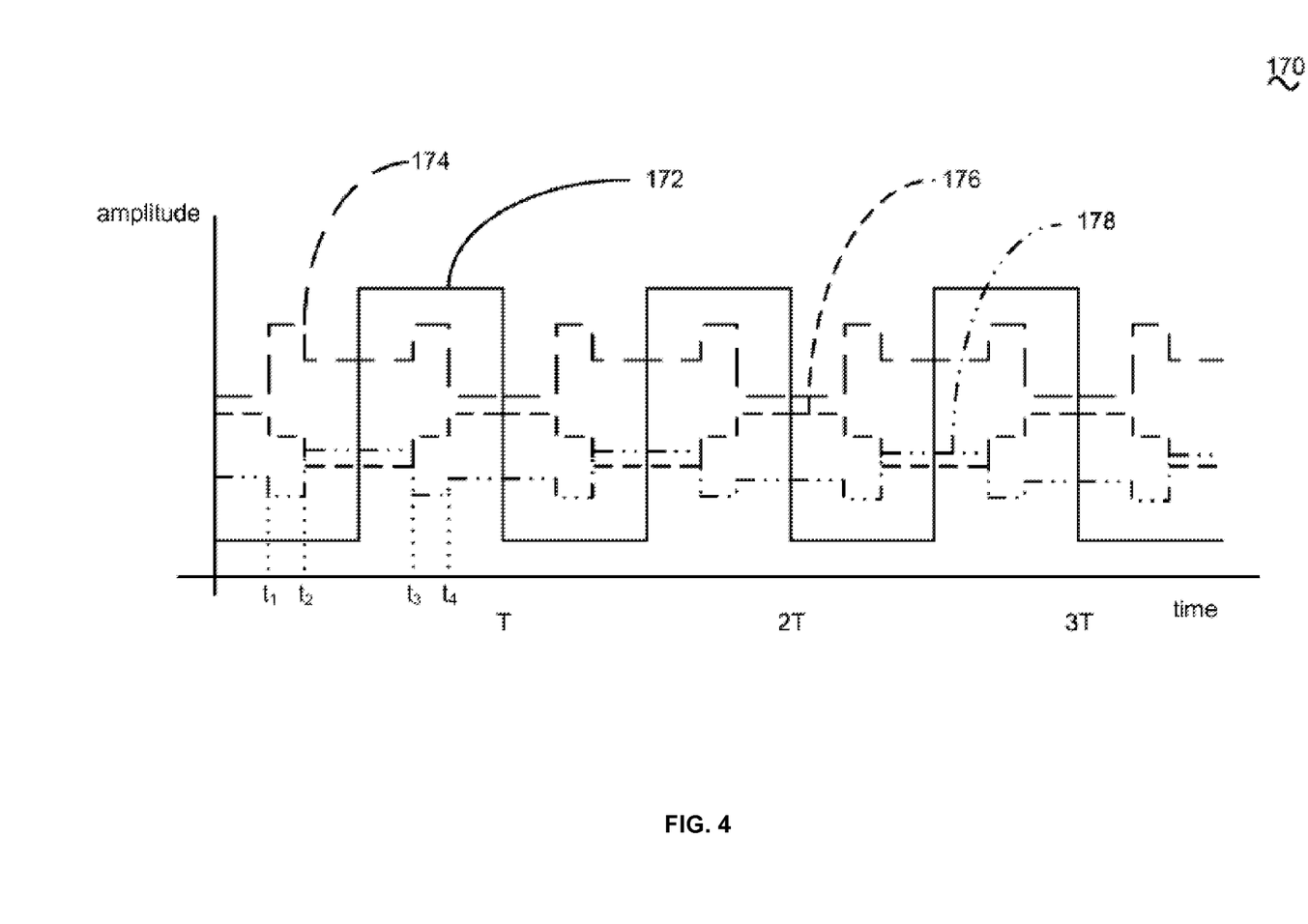
FIG. 4 is a graphical representation of example inverter control signals provided by the inverter controller of FIG. 3 according to an embodiment of the invention.

Referring now to FIG. 4, example inverter control signals 170 generated in accordance with certain embodiments of the invention can include inverter control signal for a phase A to N 174, a phase B to N 176, and a phase C to N 178. A reference signal 172 indicating the frequency of the inverter control signals is overlaid to show the period T of modulation. The three control signals 174, 176, and 178 can have three levels of magnitude for the control of the three level inverter 108. More particularly, each of the control signals can have a first magnitude between times 0 and $t_1$, a second magnitude between times $t_1$ and $t_2$, and a third magnitude between times $t_2$ and $t_3$. Between times $t_3$ and $t_4$, the magnitude between times $t_1$ and $t_2$ may repeat. Therefore it can be seen that some magnitude levels within a control signal 174, 176, and 178 for a three level inverter 108 may have a frequency greater than the frequency of the overall control signal 174, 176, and 178. In certain embodiments, the frequency of particular levels may be two times the frequency of the signal.

Figure 5:
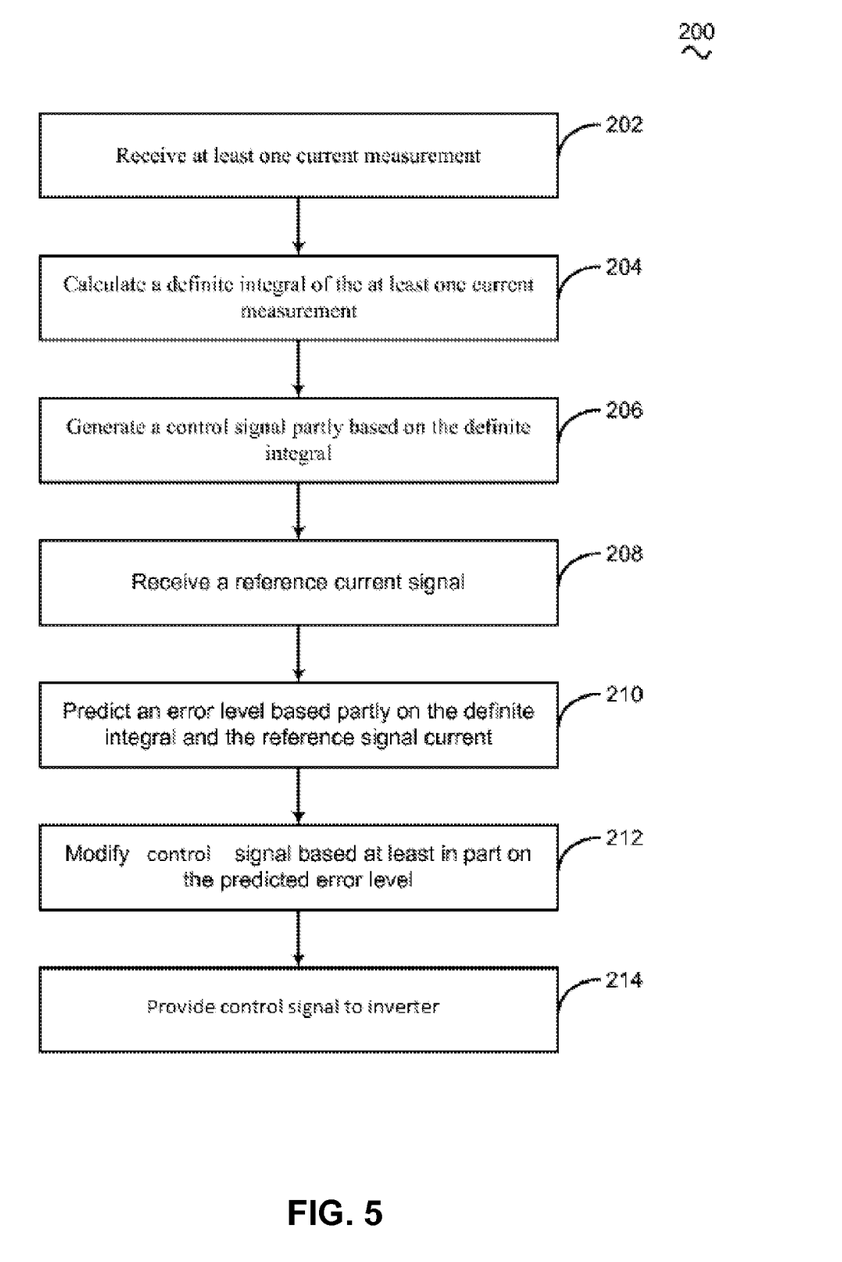
FIG. 5 is a flow diagram of an example method for providing control signals to an inverter according to an embodiment of the invention.

Referring now to FIG. 5, an example method 200 for providing control signals to the inverter in accordance to embodiments of the invention is disclosed. At block 202, at least one current measurement is received. The current measurement may be received by the inverter controller 110 as discussed with reference to FIG. 3. At block 204, a definite integral of the at least one current measurement is calculated. The definite integral can be calculated as described with reference to FIG. 3, such as in current regulator blocks 144 and 150. Next, at block 206, a control signal is generated partly based on the definite integral. The control signal may be generated by the modulator 154. At 208, a reference current signal may be received. The reference current signal may be from a higher level control loop in one aspect. In another aspect, the reference current signal may be generated from mathematical manipulation of the at least one current measurement, for example over more than one clock period of the at least one current measurement. At block 210, an error level may be predicted based partly on the definite integral and the reference current signal. At block 212, the control signal may be modified based at least in part on the determined error level. At block 214, the control signal may be provided to the inverter. Therefore the combination of blocks 210, 212, and 214 can enable providing a control signal to the three level inverter 108 that has an error level less than a predetermined threshold. In other words, the control of the inverter 108 is based on control signals generated with the definite integral of a feedback signal.

It should be noted, that the method 200 may be modified in various ways in accordance with certain embodiments of the invention. For example, one or more operations of method 200 may be eliminated or executed out of order in other embodiments of the invention. Additionally, other operations may be added to method 200 in accordance with other embodiments of the invention.

While certain embodiments of the invention have been described in connection with what is presently considered to be the most practical and various embodiments, it is to be understood that the invention is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the invention, including the best mode, and also to enable any person skilled in the art to practice certain embodiments of the invention, including making and using any devices or systems and performing any incorporated methods. The patentable scope of certain embodiments of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The claimed invention is:

1. An inverter controller for use with a renewable power source comprising:
    an input for receiving at least one measurement signal and a nominal voltage current reactive (VAR) reference signal; and,
    an output for providing at least one control signal,
    wherein, a definite integral of the at least one measurement signal is calculated and the at least one control signal is determined based on the definite integral and the at least one control signal is modified based partly upon an error level determined from the definite integral and the nominal voltage current reactive (VAR) reference signal, and
    wherein determining the error level includes calculating a difference between the definite integral and the reference signal.

2. The inverter controller of claim 1, wherein calculating the definite integral of the at least one measurement signal comprises integrating the at least one measurement signal over a clock period of the at least one current measurement signal.

3. The inverter controller of claim 1, further comprising providing a regulator for calculating the definite integral of the at least one measurement signal.

4. The inverter controller of claim 1, wherein the at least one control signal is a pulse width modulation (PWM) signal.

5. The inverter controller of claim 1, wherein modifying the at least one control signal comprises at least one of: (i) changing an amplitude of the at least one control signal; (ii) changing a frequency of the at least one control signal; or (iii) changing a phase of the at least one control signal relative to a clock signal.

6. A wind generation power system comprising:
    at least one power source;
    an inverter for receiving a power input from the at least one power source and outputting a power output; and,
    an inverter controller for controlling the inverter and comprising:
        an input for receiving at least one measurement signal and a nominal voltage current reactive (VAR) reference signal; and,
        an output for providing at least one control signal to the inverter,
        wherein a definite integral of the at least one measurement signal is calculated and the at least one control signal is determined based on the definite integral and the at least one current signal is modified based partly upon an error level determined from the definite integral and the nominal voltage current reactive (VAR) reference current signal, and
        wherein determining the error level includes calculating a difference between the definite integral and the nominal voltage current reactive (VAR) reference signal.

7. The wind generation power system of claim 6, wherein calculating the definite integral of the at least one measurement signal comprises integrating the at least one measurement signal over a clock period of the at least one measurement signal.

8. The wind generation power system of claim 6, further comprising providing a regulator for calculating the definite integral of the at least one measurement signal.

9. The wind generation power system of claim 6, wherein the at least one control signal is a pulse width modulation (PWM) signal.

10. The wind generation power system of claim 6, wherein modifying the at least one control signal comprises at least one of: (i) changing an amplitude of the at least one control signal; (ii) changing a frequency of the at least one control signal; or (iii) changing a phase of the at least one control signal relative to a clock signal.

11. A method comprising:
    receiving at least one measurement signal;
    generating a control signal partly based on the at least one measurement signal, wherein the control signal is determined based on a definite integral of the at least one measurement signal;
    determining an error level based at least partly on the at least one measurement signal; and,
    modifying the control signal based at least in part on the determined error level based partly upon an error level determined from the definite integral and the reference signal,
    wherein determining the error level includes calculating a difference between the definite integral and a reference signal.

12. The method of claim 11, wherein the at least one measurement signal comprises measuring a current through an inductor as a voltage is applied across the inductor.

13. The method of claim 11, wherein determining the error level of the at least one measurement signal comprises integrating the at least one measurement signal over a clock period of the at least one measurement signal.

14. The method of claim 11, further comprising providing a current regulator for determining the error level of the at least one measurement signal.

15. The method of claim 11, wherein the control signal is a pulse width modulation (PWM) signal.

16. The method of claim 11, wherein modifying the control signal comprises at ;east one of:
    (i) changing an amplitude of the control signal;
    (ii) changing a frequency of the control signal; or
    (iii) changing a phase of the control signal relative to a clock signal.

17. The method of claim 11, wherein modifying the control signal comprises providing the control signal to a bridge of an inverter.

* * * * *